United States Patent [19]

Inhofer

[11] 4,293,169

[45] Oct. 6, 1981

[54] WATER BEARING

[75] Inventor: Harold G. Inhofer, Hopkins, Minn.

[73] Assignee: Aeration Industries, Inc., Chaska, Minn.

[21] Appl. No.: 87,004

[22] Filed: Oct. 22, 1979

[51] Int. Cl.³ .................. F16C 17/14; F16C 33/20
[52] U.S. Cl. .................................. 308/121; 308/240
[58] Field of Search ............ 308/121, 122, 238, 240, 308/DIG. 12

[56] References Cited

U.S. PATENT DOCUMENTS

| | | |
|---|---|---|
| 1,762,373 | 6/1930 | Wright .................................. 308/240 |
| 1,856,304 | 5/1932 | Whiteley ............................... 308/240 |
| 1,923,514 | 8/1933 | Stockfleth ............................ 308/240 |
| 2,106,860 | 2/1938 | Tibbetts ................................ 308/240 |
| 2,165,916 | 7/1939 | Bissell .......................... 308/DIG. 12 |
| 2,663,599 | 12/1953 | Mackay et al. ...................... 308/238 |
| 2,810,614 | 10/1957 | Rettman .............................. 308/240 |
| 2,851,316 | 9/1958 | Thomson ............................. 308/240 |
| 3,411,706 | 11/1968 | Woollenweber, Jr. et al. ... 308/121 |
| 4,090,748 | 5/1978 | Sugimoto et al. .................... 308/240 |

OTHER PUBLICATIONS

*Product Engineering*, Jul. 1942, p. 386.
*Pollution Engineering*, Weihsmann, Peter R., Mar. 1979, pp. 53-55.
Lucian Moffet, Price lists effective 08151977, 2 pp.

*Primary Examiner*—Richard R. Stearns
*Attorney, Agent, or Firm*—Schuyler, Banner, Birch, McKie & Beckett

[57] ABSTRACT

An improved structure for supporting a rotating shaft (22) in a liquid environment is disclosed. The bearing structure (28) has an inner support surface or smooth face (38) inwardly disposed and circumferentially engaging the rotating shaft (22). The smooth face (38) has a spiraling channel (46) formed therein, and the channel (46) extends from a first axial end of the bearing (28) which is open to the liquid environment, through some axial portion of the bearing (28) to introduce ambient liquid to lubricate the interface between the bearing (28) and that portion of the shaft (22) which it engages.

18 Claims, 6 Drawing Figures

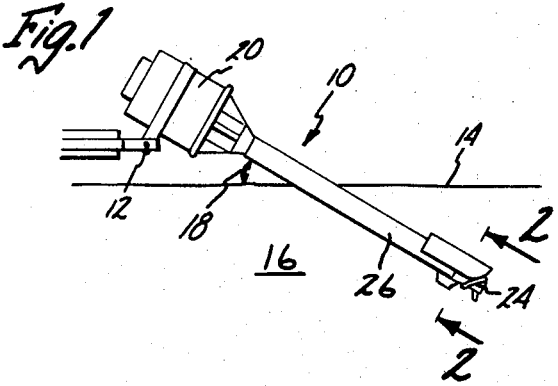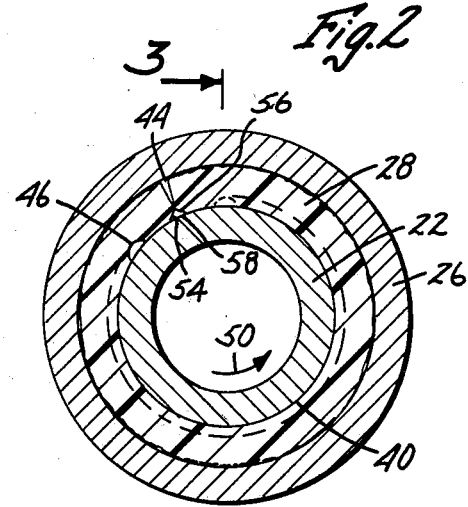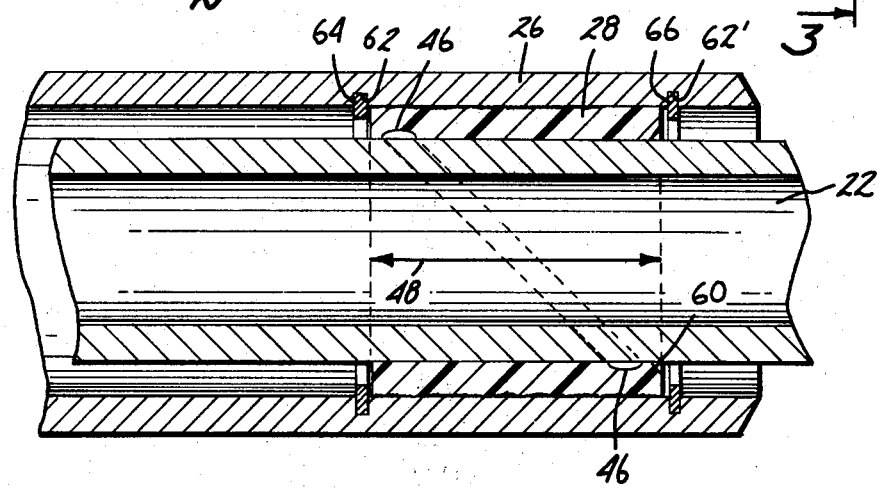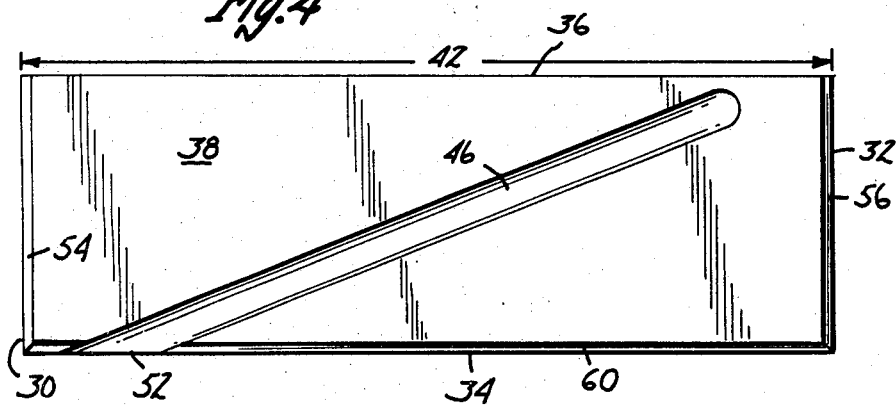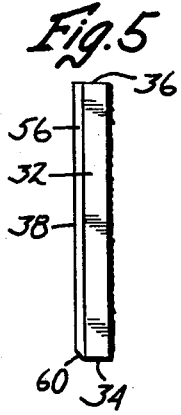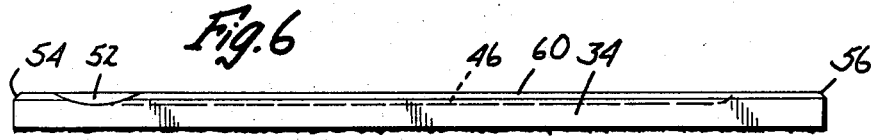

WATER BEARING

TECHNICAL FIELD

This invention relates generally to the field of bearings functioning in a fluid environment. More specifically, it relates to bearings for supporting a rotating shaft in a device for the aeration of waste water wherein that portion of the shaft supported is immersed in the waste water.

BACKGROUND OF THE PRIOR ART

Technology includes many devices which include a rotating shaft which is supported by some bearing means and wherein the rotating shaft, at the point of bearing, is immersed in a liquid. Such devices present unique problems regarding the type of bearing support to be utilized.

More conventional metallic roller and ball bearings prove to be inappropriate for support in view of the environment in which the bearing functions. Because of the metallic nature of the structures, corrosion tends to be high, thus rendering the bearing inoperative. Use of metallic alloys highly resistant to corrosion tends to alleviate some of the deterioration problems, but bearings so constructed tend to be expensive.

One particular application of a rotating shaft supported by a bearing structure in a liquid is the apparatus used for aerating liquid waste as disclosed by patent application for an apparatus for mixing a gas and a liquid, Ser. No. 898,983, filed Apr. 21, 1978, now abandoned. Other problems exist with this particular application of such a device. The liquid environment in which such a device is used contains quantities of sedimentary solids, and, when the mixing action is induced, those sediments are dispersed throughout the liquid and are introduced at the bearing. When roller or ball bearings are used (even ones which resist corrosion), the sediments tend to clog and bind the bearing and, thereby, render it ineffectual.

Because of these problems, a differently structured bearing is utilized to provide the support for the rotating shaft. An encircling structure provides the support for the shaft, and the lubrication therebetween is provided by the liquid environment itself. Application of an aqueous film to the shaft where the shaft engages the bearing surface is facilitated, and friction between the shaft and bearing is, thereby, reduced.

Typically, these bearings have been constructed as an annular collar mounted within a housing and encircling the rotating shaft. On the inner surface of the collar are formed a multiplicity of circumferentially spaced axially extending channels. It has been felt that frequent circumferential spacing of these channels is necessary in order to provide adequate flow of lubricative fluid. A common substance from which the inner surface of the collar bearing has been made is Teflon in order to preclude problems of corrosion as with metallic bearings.

As in the case with roller bearings and ball bearings, the agitated sediment remains a problem. It has been ascertained that, in this type of device, forces will tend to induce a flow of the environmental liquid up through the bearing. Bearings currently in use permit flow through the bearing at too great a volume and at too fast a rate of flow. Consequently, large volumes of sediment pass through the bearing and may cause clogging or scoring and subsequent deterioration of the bearing.

Applicant's invention provides a structure which solves the problems existent in the art.

BRIEF SUMMARY OF THE INVENTION

The present invention is an improved device for supporting a rotating shaft where the shaft, at the point of support, is immersed in a liquid. The support bearing includes an inner support surface which is circularly cylindrically contoured. The inner support surface has a first axial end which is open to the liquid environment in which the bearing functions. A channel is formed in the inner support surface. It extends from the first axial end of the bearing and spirals about the inner surface thereof. The channel, therefore, is in fluid communication with a liquid environment to which the first axial end of the bearing is open.

One embodiment of the invention can be manufactured so that the channel spirals from the first axial end of the bearing in the intended direction of rotation of the shaft which is supported. Rotation of the shaft will, in this embodiment, facilitate entry of the ambient fluid into the channel for lubricative purposes.

The bearing can be made so that the channel spirals substantially to the second axial end of the bearing in order that lubricative fluid be introduced along substantially all of that axial portion of the shaft which is engaged by the bearing surface. In embodiments to be used in environments such as devices for treatment of waste water in which amounts of sedimentary solids may be introduced into the bearing channel, the channel can be made to terminate prior to reaching the second axial end in order to prohibit free flow of the sediment-laden liquid through the channel in order to inhibit clogging.

In order to insure circumferential lubrication of the interface between the bearing and the rotating shaft in addition to axial lubrication, the channel can be made to spiral about a significant portion of the circumference of the shaft as it runs axially through the bearing. In one embodiment of the invention, the channel can spiral through just short of 360°, and the bearing can be bifurcated along its axial length by a slit extending along one side of the bearing and not intersecting the lubricating channel. By so structuring the bearing, it can be manufactured in planar form and be wrapped around the shaft during operation. A planar structure is less expensive and easier to manufacture and can more easily be inserted and removed from a mounting location within a housing enclosing the shaft.

When the bearing is manufactured in its planar form, the edge toward which the shaft rotates when the bearing is wrapped around the shaft can be beveled along the support surface inwardly toward the shaft and in the direction of rotation thereof. By beveling this edge in such a manner, wiping of a lubricative liquid film which has been applied to the rotating shaft by the fluid in the channel can be precluded.

The invention of this application is thus an improved structure for supporting a rotating shaft in a liquid environment. The specific advantages of the invention will become apparent with reference to the accompanying drawing, detailed description of the invention, and claims.

BRIEF DESCRIPTION OF THE DRAWINGS

FIG. 1 is a side elevational view of an aeration device in which the present invention can be used;

FIG. 2 is a view in section taken along the line 2—2 of FIG. 1, some parts being omitted;

FIG. 3 is a view in section taken along the line 3—3 of FIG. 2;

FIG. 4 is a top plan view of one embodiment of the present invention;

FIG. 5 is an end view of the embodiment of FIG. 4 as viewed from right to left;

FIG. 6 is a front elevational view of the embodiment of FIG. 4.

DETAILED DESCRIPTION OF THE INVENTION

Referring to the drawing wherein like reference numerals denote like elements throughout the several views, FIG. 1 shows a device, generally illustrated at 10, used for aeration treatment of waste water. The aeration unit is pivotally mounted at a point 12 above the surface 14 of the waste water 16 to be treated. By so mounting the unit, the angle 18 at which the unit extends into the water 16 can be varied. After a desired angle has been selected, the mount 12 can be tightened so that the aeration unit 10 can be held at the desired angle during operation. The unit 10 includes a motor section 20 positioned proximate the pivotal mount 12. The motor section 20 functions to rotationally drive a shaft 22 extending beneath the surface 14 of the water 16. At an end of the shaft 22 remote from the motor section 20 is mounted a propellor-type mechanism 24 which causes air to be introduced into the waste water.

A housing 26 is shown extending substantially the length of, and concentrically encircling, the shaft 22. One function of the housing 26 is to provide support for the shaft 22 as it rotates within the waste water 16. Since the housing 26 is radially spaced from the shaft 22 around the shaft periphery, a mount is necessary to maintain the relative positioning of the shaft 22 with respect to the housing 26 at the end of the shaft 22 proximate the propellor 24. The invention of the present application is a bearing 28 which functions in the ambient liquid environment in which this remote end of the shaft 22 is immersed.

It will be understood, of course, that applications of the present invention are not restricted to aeration-type devices described above. The bearing 28 can be used to support a rotating shaft in any device in which the mount is immersed in a liquid environment.

FIG. 4 shows one embodiment of the invention in which the bearing 28 can be manufactured as a planar sheet. The sheet has a first lateral edge 30, a second lateral edge 32, a first side 34 and a second side 36 opposite one another, and a smooth face 38, to which the lateral edges 30, 32 are transversely disposed, for engaging the circumferential surface 40 of the rotating shaft 22. The sheet is made of a flexible material so that it can be wrapped around the shaft 22. Although not essential to the function of the invention, the length 42 of the opposing sides 34, 36 can be made so that, when the bearing 28 is wrapped around the shaft 22 closely encircling it, the lateral edges 30, 32 abut. As seen in FIG. 2, since the length of the sides 34, 36 is substantially the same, when the bearing 28 is wrapped around the shaft 22 the lateral edges 30, 32 will abut along their intersections with the smooth face 38 to form a slit 44 extending radially outward therefrom. The bearing 28 could, of course, be manufactured so that the frontal sectional area would be generally trapezoidal in shape so that the lateral edges 30, 32 would abut along their full area when the bearing 28 is wrapped around the shaft 22.

As best seen in FIGS. 4 and 6, the smooth face 38 of the bearing 28 has formed therein a channel 46 extending generally diagonally across the smooth face 38. As seen in FIG. 4, the channel 46 extends from the first side 34 of the bearing 28, proximate the first lateral edge 30.

Although the channel 46 can take numerous forms, it is shown in FIGS. 2 and 6 as having a uniform, generally, curvilinear cross-sectional area and concave with respect to the face 38 of the bearing 28.

When the bearing 28 is wrapped around the shaft 22, the channel 46 will form a generally helically extending spiral about the shaft 22. If, when the bearing 28 were flat, the channel 46 did not extend along a straight line but, rather, were curved, the channel 46 could yet be characterized as spiraling about the shaft 22, but it would not be helical. Such a structure is, however, within the scope of applicant's invention.

As the shaft 22 rotates within the encircling bearing 28, it will be supported by the smooth face 38 of the bearing 28. Since the bearing 28 is immersed in fluid, that fluid will flow up the channel 46 and be a ready source of lubrication for the rotating shaft. As the shaft 22 rotates within the bearing 28, a fluid film will be applied to those portions of the shaft 22 passing beneath the channel 46. Embodiments are contemplated wherein the channel 46 passes through the full bearing length 48 axial with respect to a longitudinal axis of the bearing 28 as it is wrapped around the shaft 22. In these embodiments fluid will be introduced along the full axial portion of the shaft 22 engaging the bearing 28.

In certain embodiments, the channel 46 can be made to extend so that, when the bearing 28 is wrapped around the shaft 22, the channel 46 will spiral from the first side 34 in the same direction as the direction of rotation of the shaft 22. This is best illustrated in FIG. 2 wherein the arrow 50 represents the direction of rotation of the shaft 22. Arrow 50 shows shaft 22 rotating in a counter-clockwise direction, and channel 46 spirals from first side 34 in the same direction. As the shaft 22 rotates within the bearing 28, fluid communicating with the entrance 52 to channel 46 will be drawn into channel 46 by the rotation of the shaft 22. In bearing embodiments wherein channel 46 extends through the full axial length 48 of the bearing 28, significant flow of ambient fluid can be induced through the channel 46. In applications in which the bearing 28 is used in a waste water treatment device, the propellor 24 of the device causes agitation of sedimentary solids within the water 16 and those solids will be carried by the water as it flows through the channel 46. As the volume of water passing through channel 46 increases, so will the volume of solids, and clogging will become more likely. By manufacturing the bearing 28 so that channel 46 does not extend through the full axial length 48 of the bearing 28, while fluid will be allowed to pass into channel 46, not continuous flow will be induced, and clogging of the lubricative channel 46 will be substantially precluded.

FIG. 4 shows channel 46 extending substantially the length of sides 34, 36 of the planar bearing 28 so that, when the bearing 28 is wrapped around the shaft 22 and ambient water is permitted to enter the channel 46, lubrication will occur around a significant angular portion of the shaft 22. It will be understood, however, that lubrication along significantly smaller angular portions of the shaft 22 is contemplated by applicant's invention.

The embodiment discussed thus far is one in which the bearing 28 can be manufactured in a planar form to simplify and facilitate manufacture. It is, however, within the scope of the applicant's invention to manufacture a bearing in the form of a circumferentially continuous sleeve through which the shaft 22 can be made to extend. In such an embodiment, the bearing 28 has an inner support surface corresponding in function to the smooth face 38 of the planar embodiment. Similarly, the sleeve includes first and second axial ends corresponding to the first and second sides 34, 36 of the planar embodiment.

Typically, however, because of the ease of manufacture, the bearing 28 will be manufactured in the planar embodiment. When so manufactured, the first lateral edge 30, the edge toward which the shaft rotates, can be beveled as at 54 along the smooth face 38 of the bearing. The bevel 54 will extend inwardly toward the shaft 22 in the direction of rotation of the shaft when the bearing 28 is mounted in its encircling position. By so beveling the first lateral edge 30 of the bearing 28, wiping which might occur as the shaft 22 is engaged by a sharp corner can be precluded or minimized.

The second lateral edge 32 can be beveled as at 56 in a like manner but in a direction opposite that of the direction of rotation of the shaft 22. When the bearing 28 is wrapped around the shaft 22 with the lateral edges 30, 32 abutting, the two bevels 54, 56 can combine to form a second and augmenting channel 58 through which lubricative fluid can be channeled. This channel 58 would, of course, extend axially with respect to the rotating shaft 22.

Lubrication at the interface between the smooth face 38 of the bearing 28 and the rotating shaft 22 can, additionally, be augmented by chamfering the first side 34 of the bearing 28 along the smooth face 38. The chamfer 60 would be inwardly toward the shaft and toward the second side of the bearing, and is best illustrated in FIGS. 4 and 5. When the bearing is wrapped around and supporting the shaft, this chamfer 60 would facilitate entry of lubricating fluid at the first axial end of the bearing.

Regardless of the embodiment, the bearing should be manufactured from a material suitable for the conditions and environment in which it will be operating. Additionally, that material should possess a hardness adequate to provide the requisite support for the rotating shaft 22. It has been found that, by manufacturing the bearing from polyurethane, the necessary characteristics are achieved. It has been found that a polyurethane sheet with a hardness of 75 A durometer is particularly suitable. A polyurethane sheet having a hardness exceeding 75 A durometer is also appropriate.

Whether the bearing 28 is manufactured as a circumferentially continuous sleeve or as a planar sheet, it is desirable to include means to preclude the bearing 28 from shifting axially within the housing 26. As shown in FIG. 3, lock rings 64, 66 can be inserted into the housing 26 and received in grooves 62, 62' formed in the inner wall of housing 26 for this purpose. Prior to inserting the bearing 28, a first ring 64 can be inserted until received in its respective groove 62 so as to form an annular shoulder for engaging the second axial end of the bearing 28. The bearing 28 can then be inserted and secured in place by means of a second lock ring 66 which will be retained within the housing in a manner similar to the first lock ring 64.

Numerous characteristics and advantages of my invention have been set forth in the foregoing description. It will be understood, however, that this disclosure is, in many respects, only illustrative, and changes may be made in details, particularly in matters of shape, size, and arrangement of parts. The scope of the invention is defined in the language in which the appended claims are expressed.

What is claimed is:

1. A bearing for supporting a rotating shaft in a liquid environment, said bearing comprising a sleeve including a circularly cylindrical inner support surface having a first axial end, a second axial end, and a channel formed in said surface spiraling from said first axial end about the shaft for at least 300° and less than 360°, said channel communicating at said first axial end with the liquid environment in which said bearing is disposed.

2. The bearing of claim 1 wherein said channel spirals from said first axial end in the direction of the rotation of the shaft.

3. The bearing of claim 2 wherein said channel extends substantially to said second axial end of said inner surface.

4. The bearing of claim 3 wherein said channel terminates short of said second axial end of said inner surface.

5. The bearing of claim 4 wherein said channel is helical in form.

6. The bearing of claim 1 wherein said first axial end of said bearing is chamfered along said inner surface inwardly toward the shaft and toward said second axial end to facilitate the entry of liquid between said inner surface and the rotating shaft.

7. The bearing of claim 6 wherein said sleeve is bifurcated by a slit, said slit extending the axial length of said sleeve and not intersecting said channel.

8. The bearing of claim 7 wherein said sleeve extends axially with respect to a central longitudinal axis and said slit extends parallel to said axis.

9. A bearing for supporting a rotating shaft within an outer housing in a liquid environment, comprising a sheet of material with first and second lateral edges, first and second opposing sides, and one smooth face having formed therein a channel extending diagonally from said first side, proximate said first lateral edge, said sheet being flexible so that it can be mounted within the housing closely encircling the rotating shaft with said smooth face inwardly disposed.

10. The bearing of claim 9 wherein the length of said opposing sides is such that, when said bearing is mounted within said housing encircling the rotating shaft, said lateral edges abut.

11. The bearing of claim 10 wherein said bearing, when said bearing is mounted within said housing encircling the rotating shaft, has a first axial end corresponding to said first opposing side and a second axial end corresponding to said second opposing side, and wherein said channel spirals from said first axial end in the direction of the rotation of the shaft.

12. The bearing of claim 9 wherein said flexible sheet is made of polyurethane having a hardness of not less than 75 A durometer.

13. The bearing of claim 12 wherein said flexible sheet has a hardness of approximately 75 A durometer.

14. The bearing of claim 9 wherein said channel has a uniform cross-sectional area.

15. The bearing of claim 14 wherein said channel is concave with respect to said smooth face.

16. The bearing of claim 9 wherein the shaft, when said bearing is mounted encircling the shaft, rotates toward said first lateral edge and said first lateral edge is beveled along said smooth face inwardly toward, and in the direction of rotation of, the shaft.

17. The bearing of claim 16 wherein said second lateral edge is beveled along said smooth face inwardly toward, and in a direction opposite the direction of rotation of, the shaft.

18. A bearing for supporting a rotating shaft within an outer housing in a liquid environment, comprising a generally rectangular sheet of flexible polyurethane material with one smooth face, a first lateral edge transversely disposed with respect to said smooth face and beveled along said smooth face inwardly toward, and in the direction of rotation of, the shaft, a second lateral edge transversely disposed with respect to said smooth face and beveled along said smooth face inwardly toward, and in a direction opposite the direction of rotation of, the shaft, and first and second opposing sides, said smooth face having formed therein a channel, concave with respect to said smooth face, extending diagonally from said first side, proximate said first lateral edge; said sheet being capable of being mounted within the housing closely encircling the rotating shaft with said smooth face inwardly disposed and said channel spiraling helically about the shaft.

* * * * *